(12) United States Patent
Yu et al.

(10) Patent No.: US 9,002,717 B2
(45) Date of Patent: Apr. 7, 2015

(54) METHOD AND APPARATUS FOR AUDIO COMMUNICATION OF INFORMATION

(75) Inventors: Ke Yu, Alpharetta, GA (US); Ashwini Sule, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1120 days.

(21) Appl. No.: 12/960,008

(22) Filed: Dec. 3, 2010

(65) Prior Publication Data
US 2012/0143612 A1 Jun. 7, 2012

(51) Int. Cl.
| | |
|---|---|
| G10L 19/00 | (2013.01) |
| G10L 21/00 | (2013.01) |
| H04N 21/81 | (2011.01) |
| H04N 21/41 | (2011.01) |
| H04N 21/426 | (2011.01) |
| H04N 21/439 | (2011.01) |
| H04N 21/4722 | (2011.01) |
| H04N 21/658 | (2011.01) |
| H04N 21/858 | (2011.01) |

(52) U.S. Cl.
CPC ....... *H04N 21/8106* (2013.01); *H04N 21/4126* (2013.01); *H04N 21/42684* (2013.01); *H04N 21/439* (2013.01); *H04N 21/4722* (2013.01); *H04N 21/6581* (2013.01); *H04N 21/858* (2013.01)

(58) Field of Classification Search
CPC ............... H04N 19/00169; H04N 19/0023; H04N 21/42684; H04N 21/439; H04N 21/6581; H04N 21/858; G06F 17/3033; H04L 29/06027; H04L 65/602

USPC ................... 704/500–504, 278, 270
See application file for complete search history.

(56) References Cited

U.S. PATENT DOCUMENTS

| | | | | |
|---|---|---|---|---|
| 6,775,462 | B1 * | 8/2004 | Wang et al. ................... | 386/240 |
| 7,058,694 | B1 * | 6/2006 | De Bonet et al. ............. | 709/217 |
| 7,167,451 | B1 * | 1/2007 | Oran ............................. | 370/252 |
| 7,460,684 | B2 * | 12/2008 | Srinivasan .................... | 382/100 |
| 8,296,390 | B2 * | 10/2012 | Wood ............................ | 709/217 |
| 8,406,797 | B2 * | 3/2013 | Kies ............................. | 455/518 |
| 8,462,961 | B1 * | 6/2013 | Bywaters et al. ............... | 381/77 |
| 8,484,035 | B2 * | 7/2013 | Pentland ....................... | 704/278 |
| 8,515,761 | B2 * | 8/2013 | Agrawal et al. .............. | 704/270 |
| 2003/0118162 | A1 * | 6/2003 | Itoh ............................ | 379/93.01 |
| 2003/0233436 | A1 * | 12/2003 | Slemmer et al. ............. | 709/223 |
| 2004/0264713 | A1 | 12/2004 | Grzesek | |
| 2005/0021539 | A1 * | 1/2005 | Short et al. .................... | 707/100 |
| 2005/0075880 | A1 * | 4/2005 | Pickover et al. ............. | 704/270 |
| 2005/0091057 | A1 * | 4/2005 | Phillips et al. ............. | 704/270.1 |

(Continued)

*Primary Examiner* — Abdelali Serrou
(74) *Attorney, Agent, or Firm* — Guntin & Gust, PLC; Andrew Gust

(57) ABSTRACT

A system that incorporates teachings of the present disclosure may include, for example, a controller configured to obtain information associated with media content, to generate a first group of tones representative of the information associated with the media content, and to generate a media stream comprising the media content and the first group of tones; and a communication interface configured to transmit the media stream to a media device whereby the media device presents the media content and a sequence of tones, where the sequence of tones is generated based at least in part on the first group of tones, where the first group of tones comprises high frequency tones and low frequency tones, and where one of the high and low frequency tones represents a binary one and the other of the high and low frequency tones represents a binary zero. Other embodiments are disclosed.

19 Claims, 5 Drawing Sheets

(56) References Cited

U.S. PATENT DOCUMENTS

| | | | |
|---|---|---|---|
| 2006/0008074 A1* | 1/2006 | Itoh | 379/386 |
| 2008/0147410 A1* | 6/2008 | Odinak | 704/270.1 |
| 2008/0159178 A1* | 7/2008 | Syrjanen et al. | 370/261 |
| 2009/0106030 A1* | 4/2009 | Den Brinker et al. | 704/500 |
| 2009/0144795 A1* | 6/2009 | Yu et al. | 725/118 |
| 2010/0058382 A1* | 3/2010 | Yu et al. | 725/35 |
| 2011/0086593 A1* | 4/2011 | Hardacker | 455/41.3 |
| 2011/0238414 A1* | 9/2011 | Ju et al. | 704/201 |

* cited by examiner

300

METHOD AND APPARATUS FOR AUDIO COMMUNICATION OF INFORMATION

FIELD OF THE DISCLOSURE

The present disclosure relates generally to communication systems and more specifically to a method and apparatus for audio communication of information.

BACKGROUND

Users often desire information associated with media content that is being presented. Obtaining the information typically requires the user to either remember the media content and later perform a search for the information (e.g., a web-based search) or requires the user to interrupt his or her viewing and/or listening to the media content to perform the search.

DETAILED DESCRIPTION

Figure 1:
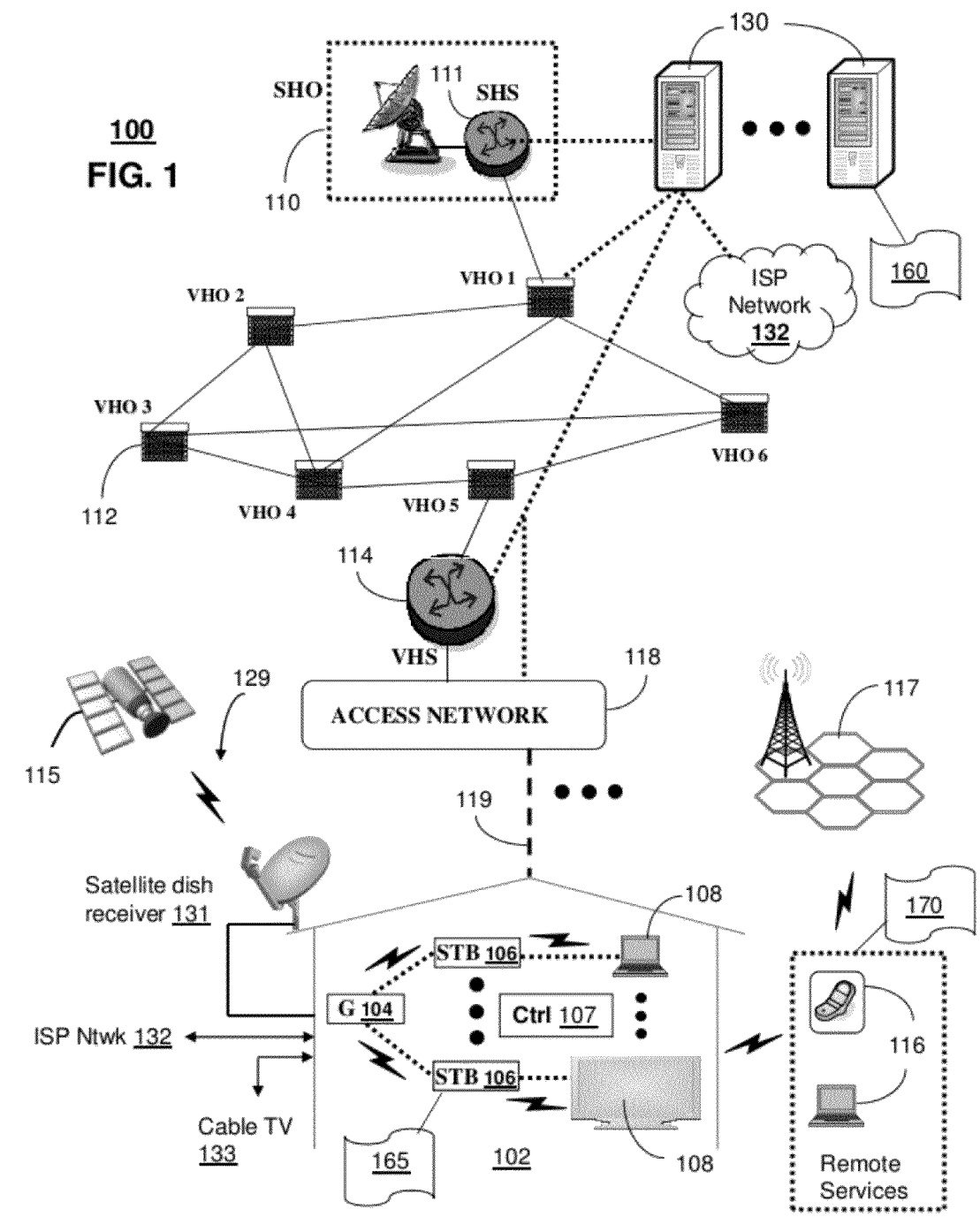
FIG. 1 depicts an illustrative embodiment of a communication system that provides media services.

The present disclosure describes, among other things, illustrative embodiments of providing information associated with media content to a communication device via a sequence of tones presented by a media device. The tones can be distinguished based on frequency, such as using a binary code with high and low frequency tones. The sequence of tones can also include information identifying the media device presenting the media content. The sequence of tones can be generated based on a first group of tones that are embedded in, or otherwise provided with, the media content distributed to the media device. In one embodiment, an OR bit-wise operator can be used to combine the media device identification with the information associated with the media content. In another embodiment, a distance between the media device and the communication device can also be determined based on the sequence of tones.

In one embodiment, the communication device (e.g., a smart phone) can detect the tones and can convert the tones to sequences of binary code based on a separately defined protocol which is understood by both a remote server and the communication device. The communication device can then send a request containing the sequences to the server which interprets the sequence code and responds to the communication device with information such as service provider description, channel description and program description. The server (or attached database) can also store identification information for media devices (such as in the form of binary code which is converted into sequence of tones when needed). The identification information can be saved during the media device provisioning process. Other embodiments are contemplated by the present disclosure.

One embodiment of the present disclosure includes a tangible computer-readable storage medium, which includes computer instructions at least to record an audio signal presented by a media device, where the audio signal includes audio content and a sequence of tones, where the sequence of tones is generated based on a first and second group of tones, where the first group of tones is inserted into the audio content by a remote server prior to receipt by the media device, and where the second group of tones is combined with the first group of tones by the media device. The computer instructions can also determine information associated with the audio content based on the first group of tones and determine identification information associated with the media device based on the second group of tones.

One embodiment of the present disclosure includes a method comprising receiving an audio stream at a media device, where the audio stream includes audio content and a first group of tones, and where the first group of tones represents information associated with the audio content. The method also includes generating a sequence of tones based in part on the first group of tones, where the sequence of tones is representative of the information associated with the audio content and is representative of identification information associated with the media device. The method further includes presenting the audio content and the sequence of tones.

One embodiment of the present disclosure includes a server comprising a controller and a communications interface. The controller is configured to obtain information associated with media content, generate a first group of tones representative of the information associated with the media content, and generate a media stream comprising the media content and the first group of tones. The communications interface is configured to transmit the media stream to a media device whereby the media device presents the media content and a sequence of tones, where the sequence of tones is generated based at least in part on the first group of tones, where the first group of tones comprises high frequency tones and low frequency tones, and wherein one of the high and low frequency tones represents a binary one and the other of the high and low frequency tones represents a binary zero.

In one embodiment, the bandwidth of the exemplary embodiment may be limited so it may not be able to carry too much data. To mitigate this issue, a key-URI pair can be utilized in which the key is randomly generated number (e.g., a 32-bit integer). This pair can be saved in a backend database or server when the content provider provisions the audio stream (e.g., a separate tool can be used for provisioning) with tones. During this provisioning process, the key can be converted to a tone sequence and carried in the audio stream. The communication device can detect this key and can access the server to look up the URI.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to communication devices 108 such as computers or television sets managed in some instances by a media controller 107 (such as an infrared or RF remote control).

The gateway 104, the media processors 106, and the communication devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the communication devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure. As described herein, media devices can be various types of devices that are capable of presenting media content and can include an STB, a television, a computer, a mobile device, a radio and so forth.

Communication system 100 can also provide for all or a portion of the computing devices 130 to function as a remote server to obtain information associated with media content and generate a first group of tones that represent the information. The remote server 130 can use common computing and communication technology, such as tone generation software 160, to obtain and/or generate the first group of tones. The remote server 130 can inject, insert or otherwise provide the first group of tones with media content that is to be distributed. The media content can be of various forms as described above, including audio and/or video content.

The information can be various types of information related to the media content, including context information. For instance, the context information can identify a service provider and/or identify a channel upon which the media content is being distributed (e.g., broadcast, multicast, or unicast). In another embodiment, the context information can identify the media content, such as a title, actors, singers, songs, programming and so forth. For instance, identification information associated with audio content can include the title of a song and the programming in which the song is being played. Other context information is also contemplated by the present disclosure, such as media parameters, including identifying High Definition content, three-dimensional content and so forth. In another embodiment, the information can be access information, such as identifying a uniform resource identification that can be used for accessing the media content (e.g., at a later time) and/or accessing information related to the media content, including ancillary information such as goods or services associated with the media content, actors/singers biographies, related media content (e.g., movies in the same genre) and so forth.

In another embodiment, the media processor 106 can receive the audio stream from remote server 130 and can generate a second group of tones, such as through use of tone software 165. The second group of tones can represent identification information associated with the media processor 106. The media processor 106 can inject, insert or otherwise provide the second group of tones with media content and the first group of tones. In one embodiment, the media processor can utilize Boolean operators (e.g., a component functioning as an OR bit-wise operator) to generate a sequence of tones based on the first and second group of tones. However, the present disclosure contemplates generating the tones which combine the various information using other techniques, including other Boolean operators (e.g., an AND bit-wise operator).

The media processor 106 can then present the media content, along with the first and second groups of tones. The present disclosure contemplates the media processor 106 being various types of devices that can present or otherwise playback media content, including an STB, a television, a computer, a radio, a mobile device (e.g., a mobile phone) a PDA and so forth. While this exemplary embodiment describes generating and presenting the second group of tones, it is also contemplated that the media processor 106 can present the media content and the first group of tones without generating or presenting the second group of tones.

In one embodiment, communication device 116 can include tone translation software 170 that allows the devices to recognize the tones that are being emitted from the media processor or a device coupled with the media processor (e.g., television speakers). It should be understood that the present disclosure contemplates the communication device recognizing audio signals which are being presented or emitted from the media devices (e.g., media processor 106, television 108 and so forth) along with the audio content (e.g., speech in a movie, a song and so forth). The presentation of the tones and the audio content is via presentation components coupled with the media devices, including audio speakers. The communication device 116 can determine the information (e.g., context information and/or identification information) based on the first and second groups of tones. For example, the communication device 116 can record an audio signal emitted from a television set where the audio signal includes audio content, the first group of tones and the second group of tones. The communication device 116 can then process the first and second groups of tones to determine the context information and/or the identification information.

In one embodiment, the tones can be distinguished based on different frequencies. For example, high frequency tones (e.g., tones within a first predetermined range of frequencies) can represent a binary one and low frequency tones (e.g., tones within a second predetermined range of frequencies) can represent a binary zero. The tones can then be processed utilizing binary algorithms. The particular frequencies used for the high and low frequency tones can vary. For example, high frequency tones can be tones within a pre-determined amount of 20 KHz, while low frequency tones can be tones within a pre-determined amount of 20 Hz. However, other ranges are also contemplated by the present disclosure. In one embodiment, the frequencies utilized can be between 20 Hz and 20 KHz, but the tones can be generated so as to avoid interference with audible content, such as using a small duration of the tone (e.g., 20 ms or less). The exemplary embodiments described herein also contemplate utilizing frequencies that are outside of the human audible frequency range, such as ultrasound and/or infrasound.

The particular pattern and duration of the tones can vary. For instance the tones can be of a uniform duration (e.g., 20 ms) or can be of a variable duration. Other durations for the tones can also be utilized including less than 20 ms or more than that amount of time. In another embodiment, the first and/or second groups of tones can be repeated throughout the entirety, or a portion, of the presentation of the audio content. The time period between repeating the tones can vary based on a number of factors, including resources. In one embodiment, the second group of tones can be repeated each time the first group of tones is repeated, although the present disclosure also contemplates presenting the first and second groups of tones in different patterns.

In one or more exemplary embodiments, the tone sequences in the media content and media device can be repeated every certain amount of time, so that the communication device can always detect the tone sequences in real time.

Illustrative embodiments of methods that can operate in portions of the devices of FIG. 1 are described below.

Figure 2:
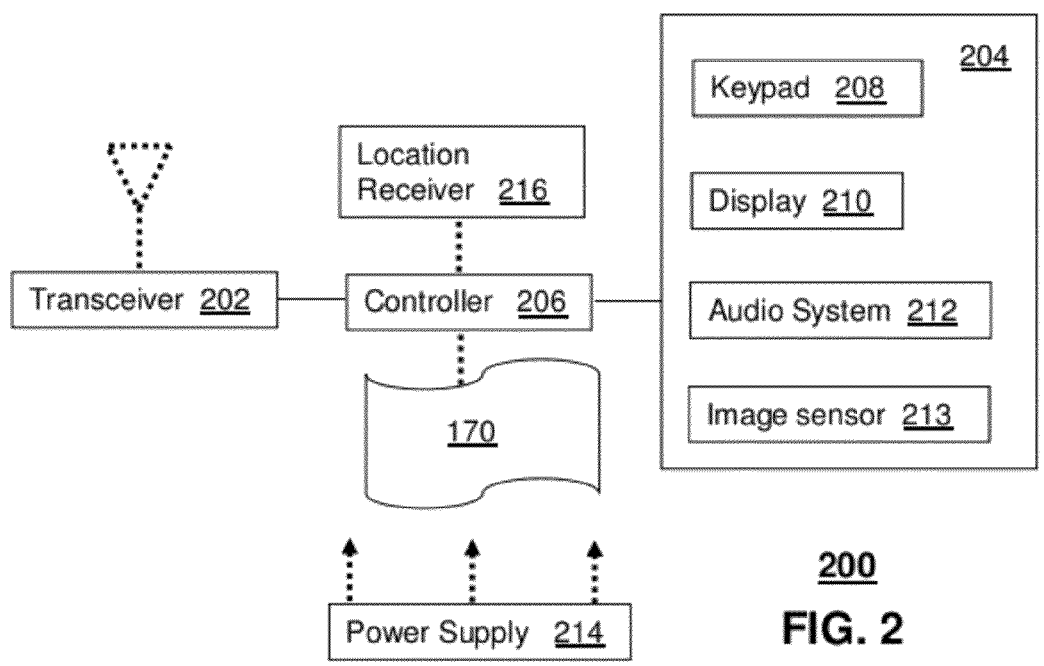
FIG. 2 depicts an illustrative embodiment of a communication device utilized in the communication system of FIG. 1.

FIG. 2 depicts an exemplary embodiment of a communication device 200. Communication device 200 can serve in whole or in part as an illustrative embodiment of the devices depicted in FIG. 1. The communication device 200 can comprise a wireline and/or wireless transceiver 202 (herein transceiver 202), a user interface (UI) 204, a power supply 214, a location receiver 216, and a controller 206 for managing operations thereof. The transceiver 202 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 202 can also be adapted to support circuit-switched wireline access technologies (such as PSTN), packet-switched wireline access technologies (such as TCPIP, VoIP, etc.), and combinations thereof.

The UI 204 can include a depressible or touch-sensitive keypad 208 with a navigation mechanism such as a roller ball, a joystick, a mouse, or a navigation disk for manipulating operations of the communication device 200. The keypad 208 can be an integral part of a housing assembly of the communication device 200 or an independent device operably coupled thereto by a tethered wireline interface (such as a USB cable) or a wireless interface supporting for example Bluetooth. The keypad 208 can represent a numeric dialing keypad commonly used by phones, and/or a Qwerty keypad with alphanumeric keys. The UI 204 can further include a display 210 such as monochrome or color LCD (Liquid Crystal Display), OLED (Organic Light Emitting Diode) or other suitable display technology for conveying images to an end user of the communication device 200. In an embodiment where the display 210 is touch-sensitive, a portion or all of the keypad 208 can be presented by way of the display 210 with its navigation features.

The UI 204 can also include an audio system 212 that utilizes common audio technology for conveying low volume audio (such as audio heard only in the proximity of a human ear) and high volume audio (such as speakerphone for hands free operation). The audio system 212 can further include a microphone for receiving audible signals of an end user. The audio system 212 can also be used for voice recognition applications. The UI 204 can further include an image sensor 213 such as a charged coupled device (CCD) camera for capturing still or moving images.

The power supply 214 can utilize common power management technologies such as replaceable and rechargeable batteries, supply regulation technologies, and charging system technologies for supplying energy to the components of the communication device 200 to facilitate long-range or short-range portable applications. The location receiver 216 can utilize common location technology such as a global positioning system (GPS) receiver capable of assisted GPS for identifying a location of the communication device 200 based on signals generated by a constellation of GPS satellites, thereby facilitating common location services such as navigation.

The communication device 200 can use the transceiver 202 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such a Flash, ROM, RAM, SRAM, DRAM or other storage technologies.

The communication device 200 can be adapted to perform the functions of the media processor 106, the media devices 108, or the portable communication devices 116 of FIG. 1. It will be appreciated that the communication device 200 can also represent other common devices that can operate in communication system 100 of FIG. 1 such as a gaming console and a media player.

Communication device 200 can include translation software 170 that provides computer instructions for translating tones into information, such as the context information and/or the identification information described above with respect to system 100. Communication device 200 can recognize tones being presented or emitted by a media device, such as first and second groups of tones interleaved or otherwise combined with audio content presented by the media device, and can determine the information from the tones. In one embodiment, the tones represent binary ones and zeros which are then translated into the desired information.

Illustrative embodiments of methods that can operate in portions of the communication device of FIG. 2 are described below.

Figure 3:
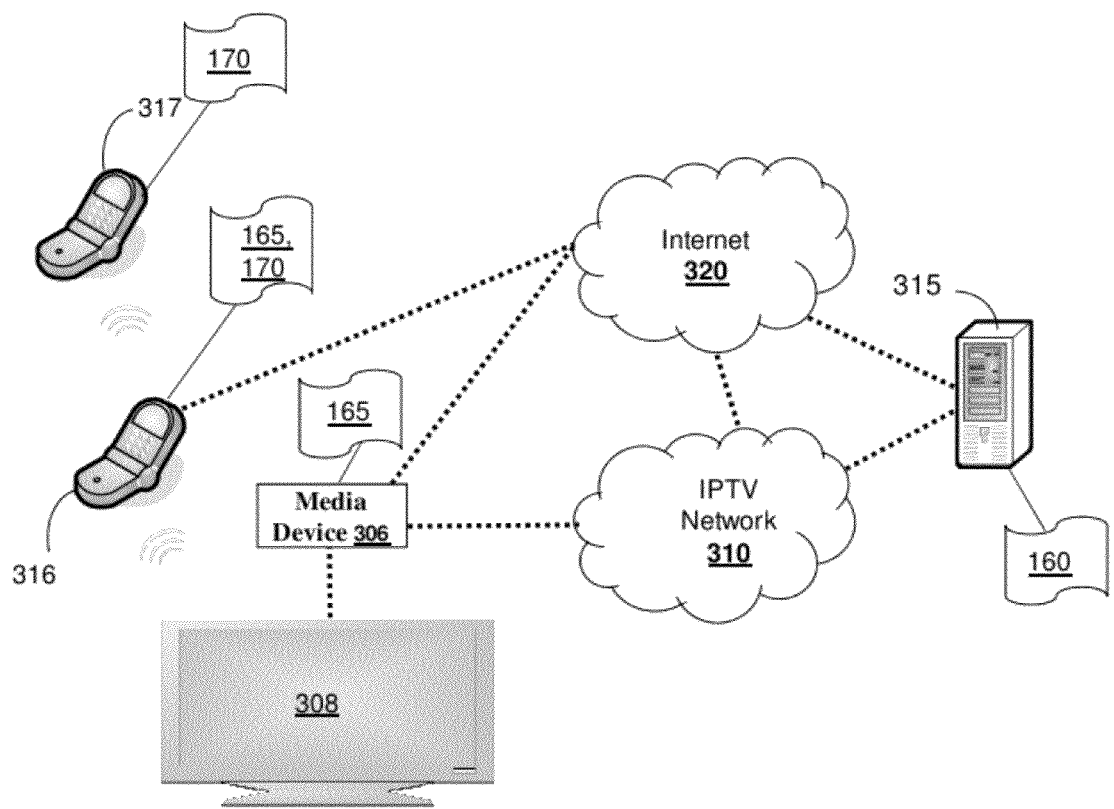
FIG. 3 depicts an illustrative embodiment of a system that provides audio communication of information.

FIG. 3 illustrates is a communication system 300 that can deliver media content to one or more media devices. System 300 can be overlaid or operably coupled with all or a portion of system 100. System 300 can include an IPTV network 310 for distributing media content to media device 306 (e.g., customer premises equipment). The particular media device 306 receiving the media content can vary and can include an STB, a television, a computer, a DVR, a radio, a mobile phone and so forth. In this embodiment, the media device 306 is coupled with a display device 308 for presentation of the media content. Although the present disclosure describes distribution of the media content via an IPTV network 310, it should be understood that other networks can also be utilized, including other types of interactive or non-interactive networks.

System 300 provides a remote server 315 that inserts or otherwise adds a first group of tones to the media content where the tones represent information associated with the media content, such as context information. Remote server 315 can be a service provider device, such as located at the SHO, and/or can be a third party-device, such as a broadcaster or studio device. In one embodiment, the media content and the first group of tones can be distributed at least in part via the Internet 320. In another embodiment, the media content and the first group of tones can be distributed without using the IPTV network 310.

The media device 306 can generate a second group of tones that represent identification information associated with the media device (e.g., model number, software version, and so forth) and can insert or otherwise add the second group of tones to the media content. One or more communication devices 316 can recognize the first and second tones when they are emitted or otherwise presented by the media device 306 or from a presentation device coupled with the media device, such as a television 308, along with the audio content that is also being emitted or presented. The recognized tones can then be used by the communication device 316 for determining the information (e.g., context information and/or identification information).

In one embodiment, the media device 306 emitting or presenting the audio content and the first and/or second groups of tones can be the communication device 316. For example, the communication device 316 can receive a media stream from the Internet 320, where the media stream includes the media content and the first group of tones. The communication device 316 can insert or otherwise add the second group of tones to the media content and the first group of tones. The communication device 316 can then emit or otherwise present the media content, the first group of tones and/or the second group of tones. Another communication device 317 can recognize the tones (e.g., record the tones) and process the tones to determine the context information and/or the identification information.

Figure 4:
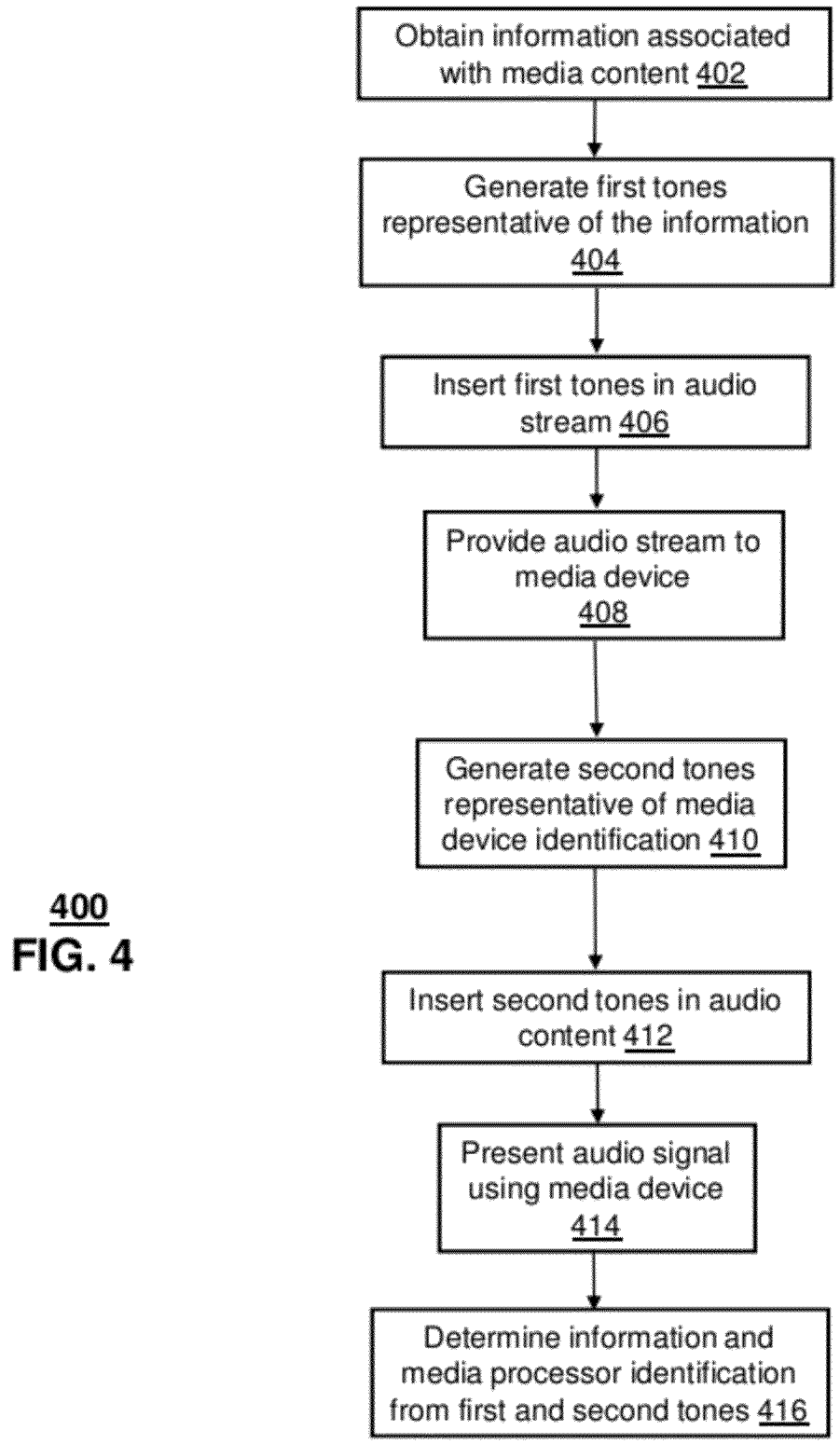
FIG. 4 depicts an illustrative embodiment of a method operating in portions of the systems and devices described in FIGS. 1-3.

FIG. 4 depicts an illustrative method 400 that operates in portions of the systems and/or devices of FIGS. 1-3. Method 400 can begin with step 402 in which information associated with media content is obtained, such as by remote server 315. The information obtained can vary, such as context information and/or ancillary information, and can include the examples described with respect to systems 100 and 300. The information can be obtained in various ways, such as based on metadata that accompanies the media content and/or from other sources, including local and/or remote databases. In one embodiment, upon receipt of media content that is to be distributed to users, the remote server or a device(s) coupled with the remote server can perform a search for the information, such as a web-based search and/or a query of the source of the media content.

In step 404, a first group of tones can be generated that represent the obtained information. For example, the remote server 315 can select and generate tones based on frequencies that are representative of the information. As described herein, the tones can be distinguishable based on frequency, such as using a binary code where one of the high or low frequency tones represents binary zero and the other of the high or low frequency tones represents binary one. The present disclosure also contemplates other techniques being utilized for translating the tones into information. For example, the tones can be distinguished based on frequency using a non-binary technique (e.g., ternary) and/or can directly represent alphabetical characters. In another embodiment, the tones can be distinguishable, in whole or in part, based on other characteristics, such as duration. For example, a tone of a first frequency and a first duration can represent first information (or a portion of the information such as an alphabetical character), while a tone of the same first frequency but of a different second duration can represent different second information.

The first group of tones can be inserted or otherwise added to the audio content in an audio stream being delivered to the users in step 406. The insertion of the tones into the audio stream can be performed in various ways. For instance, the tones can be added at pre-determined intervals with the audio content. In another embodiment, the tones can be added during periods of silence or of low audio content in the media content. The first group of tones can repeat at regular intervals or can repeat at irregular intervals.

In step 408, the audio stream is transmitted to the media device 306 (or the communication device 316), such as via IPTV network 310 and/or the Internet 320. Other networks or methods of distribution are also contemplated. Providing an audio or media stream is intended to encompass these networks and methods, including broadcast, multicast and/or unicast techniques. In step 410, a second group of tones can be generated which are representative of identification information for the media device. The second group of tones can be generated at various times. For instance, the second group of tones can be generated and stored by the media device 306 for use with media content upon the receipt of the media content so that the media device is not wasting resources re-generating the tones each time media content is received. In another embodiment, the second group of tones can be generated based on the first group of tones or other information associate with the audio stream. For example, the media device 306 can recognize or otherwise determine the technique being utilized by the first tones for distinguishing between tones, such as the binary example described above, and can then generate tones that can be distinguished using the same technique. In another example, the particular technique to be utilized for distinguishing the tones can be identified in data other than in the tones, such as metadata that is embedded in the audio stream.

In step 412, the second group of tones can be inserted or otherwise added with the audio content and the first group of tones. The insertion of the tones into the audio stream can be performed in various ways. For instance, method 400 can utilize a 16 bit format for communicating the media content information. The media device 306 can then utilize an OR bit-wise operator to add the second group of tones with the first group of tones. The resulting sequence of tones can then be presented by the media device so that the media content information and the media device identification can be extracted from the sequence of tones. As another example, the tones can be added at pre-determined intervals with the audio content. In another embodiment, the tones can be added during periods of silence or of low audio content in the media content. The second group of tones can repeat at regular intervals or can repeat at irregular intervals.

The media device 306 (and/or the communication device 316) can present the media content along with the tones that represent the media content information and the media device identification in step 414. The communication devices 316 and/or 317 can recognize the tones being presented and can extract the media content information and/or the media device identification from the tones in step 416. In one embodiment, the communication devices 316 and/or 317 act as passive devices when determining the information from the presented tones since they do not transmit any data in order to perform the determination but rather record the tones and process them.

Method 400 allows for information associated with different media content being provided by a service provider over various channels to be communicated to a communication device. For instance, as the channels are being switched, the communication device can determine channels and/or media content being presented on the channels based on the tones being presented. Method 400 can also be utilized for different service providers. Once the information is determined by the communication device 316, it can be used for various purposes. For instance, it can be merely informative, such as presenting the information to the user of the communication device 316 (e.g., on a display or audible). The information can also be utilized for providing or otherwise facilitating media services for the communication device 316. For example, the information can include a URL that can be accessed by the communication device 316 (automatically or otherwise) so that the user of the communication device can browse goods or services related to the media content.

In one embodiment, the media device 306 can determine the information from the first group of tones that have been provided with the media stream and can present the information. For example, the media device 306 can receive the media stream with the media content and the first group of tones. The media device can generate the sequence of tones for presentation while also presenting the information that is represented by the first group of tones, such as the title or actors in a movie.

Various other embodiments are also contemplated by the present disclosure utilizing all or portions of the devices, systems and methods described with respect to FIGS. 1-4. For example, changes in the audio content can be represented by changes to the sequence of tones being presented. For instance, the first group of tones can include scene information related to the media content being presented. As the scene changes, the first group of tones can be changed which will result in a change to the sequence of tones. The changes to the media content can be represented by changes to the first group of tones and/or changes to tones generated by the media device. For instance, the media device 306 can generate the second group of tones to represent the media device identification information and can also include other information in the second group of tones, such as changes in the media content. As one example, the media content can be a sporting event and the sequence of tones that are being presented can include a score of the game. As the score changes, the sequence of tones can be altered to reflect the change of score.

In another embodiment, the communication of the information to the communication device via the tones can be performed according to communication protocols, including existing protocols such as MP4.

Figure 5:
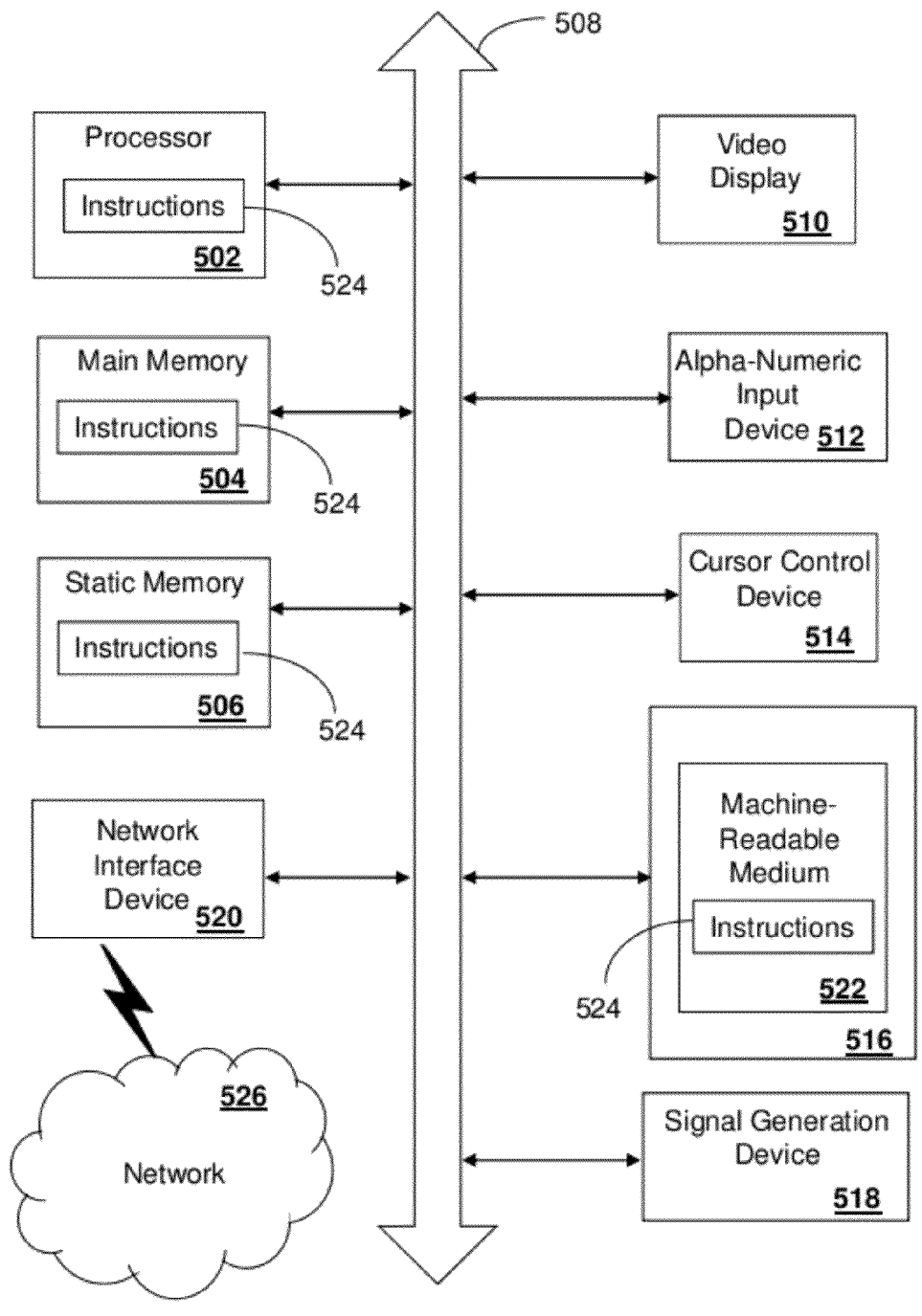
FIG. 5 is a diagrammatic representation of a machine in the form of a computer system within which a set of instructions, when executed, may cause the machine to perform any one or more of the methods discussed herein.

FIG. 5 depicts an exemplary diagrammatic representation of a machine in the form of a computer system 500 within which a set of instructions, when executed, may cause the machine to perform any one or more of the methods discussed above. One or more instances of the machine can operate, for example, as the communication device 316 and/or 317, the media device 306, the remote server 315, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any medium that is capable of storing, encoding or carrying a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium or a tangible distribution medium, as listed herein and including art-recognized equivalents and successor media, in which the software implementations herein are stored.

The present disclosure further contemplates intangible computer-readable instructions, intangible structured or unstructured data, and/or intangible program modules in a data signal such as a modulated data signal, e.g., a carrier wave or other transport mechanism. The term "modulated data signal" or signals refers to a signal that has one or more of its characteristics changed in such as manner as to encode information in one or more signals. By way of example, and without limitation, transport media may include wired media, such as a wired network or direct-wired connection, and wireless media such as acoustic, RF, infrared or other forms of wireless media.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device, comprising computer instructions which, responsive to being executed by a processor of a communication device, cause the processor to perform operations comprising:

recording, by the communication device, an audio signal presented by a media device, wherein the audio signal comprises audio content and a sequence of tones, wherein the audio content corresponds to video content being presented by the media device, wherein the sequence of tones is generated based on a first and second group of tones, wherein the first group of tones represents information associated with the audio content and is separate from the audio content, wherein the second group of tones represents identification information associated with the media device and is separate from the audio content, wherein the first group of tones is inserted into an audio stream that includes the audio content and is inserted by a remote server prior to receipt of the audio stream over a network by the media device, and wherein the second group of tones is combined with the first group of tones by the media device;

determining, by the communication device which is different from the media device, the information associated with the audio content based on the first group of tones; and determining, by the communication device, the identification information associated with the media device based on the second group of tones.

2. The computer-readable storage device of claim 1, wherein the sequence of tones are at frequencies between 20

Hz and 20 kHz, and wherein the sequence of tones are used to identify the media device using the identification information.

3. The computer-readable storage device of claim 1, wherein the sequence of tones comprises high frequency tones and low frequency tones, wherein one of the high and low frequency tones represents a binary one and the other of the high and low frequency tones represents a binary zero.

4. The computer-readable storage device of claim 1, wherein the media device is a set top box, and wherein the network is an interactive television network.

5. The computer-readable storage device of claim 1, wherein the information comprises identification of a channel being utilized to broadcast the audio content.

6. The computer-readable storage device of claim 1, wherein the information comprises identification of a service provider broadcasting the audio content.

7. The computer-readable storage device of claim 1, wherein the information comprises context information for the video content.

8. The computer-readable storage device of claim 1, wherein the operations further comprise performing echo cancellation on the recorded audio signal.

9. A method, comprising:
receiving over a network an audio stream at a media device, the audio stream comprising audio content and a first group of tones, wherein the audio content corresponds to video content being presented by the media device, wherein the first group of tones represents information associated with the audio content and is separate from the audio content;
generating, by the media device, a sequence of tones including a second group of tones representative of identification information associated with the media device and is separate from the audio content;
combining, by the media device, the second group of tones with the first group of tones; and
presenting, by the media device, the audio content, the first group of tones and the second group of tones to enable a communication device, which is different from the media device, to detect and analyze the information associated with the audio content based on the first group of tones and the identification information associated with the media device based on the second group of tones.

10. The method of claim 9, comprising repeating the presentation of the sequence of tones during the presentation of the audio content.

11. The method of claim 9, wherein the information associated with the audio content comprises a uniform resource identifier associated with the audio content.

12. The method of claim 9, comprising:
receiving the video content associated with the audio content; and
presenting the video content on a display device coupled with the media device.

13. The method of claim 9, wherein the sequence of tones comprises high frequency tones and low frequency tones, and wherein one of the high and low frequency tones represents a binary one and the other of the high and low frequency tones represents a binary zero.

14. The method of claim 9, wherein the media device is a mobile device configured for wireless voice communications.

15. The method of claim 9, wherein the sequence of tones is generated using an OR bit-wise operator.

16. A server comprising:
a processor; and
a memory that stores executable instructions that, when executed by the processor, facilitate performance of operations, comprising:
obtaining information associated with media content that includes audio content;
generating a first group of tones representative of the information associated with the audio content and is separate from the audio content, and generating a media stream comprising the media content and the first group of tones; and
a communication interface that transmits the media stream over a network to a media device to enable the media device to present the media content including video content, the audio content and a sequence of tones including the first group of tones and a second group of tones, wherein the media device combines the second group of tones with the first group of tones, wherein the audio content corresponds to the video content being presented by the media device, wherein the first group of tones comprises high frequency tones and low frequency tones, wherein one of the high and low frequency tones represents a binary one and the other of the high and low frequency tones represents a binary zero, wherein the second group of tones represents identification information associated with the media device and is separate from the audio content, wherein the audio content and the first and second group of tones are recordable by a communication device, different from the media device, to enable the communication device to determine the information associated with the audio content based on the first group of tones and to enable the communication device to determine the identification information associated with the media device based on the second group of tones.

17. The server of claim 16, wherein the sequence of tones changes based on changes in the media content, and wherein the changed sequence of tones is subsequently presented by the media device.

18. The server of claim 16, wherein the information associated with the media content comprises identification of a service provider distributing the media content.

19. The server of claim 16, wherein the sequence of tones is generated using an OR bit-wise operator.

* * * * *